United States Patent
Jang et al.

(10) Patent No.: US 7,757,668 B2
(45) Date of Patent: Jul. 20, 2010

(54) METHOD OF CORRECTING FLOW RATE IN FUEL SUPPLY UNIT OF FUEL CELL SYSTEM

(75) Inventors: Won-Hyouk Jang, Suwon-si (KR); Dong-Yun Lee, Yongin-si (KR); Sang-Hyeon Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 288 days.

(21) Appl. No.: 11/475,421

(22) Filed: Jun. 26, 2006

(65) Prior Publication Data
US 2006/0292011 A1 Dec. 28, 2006

(30) Foreign Application Priority Data
Jun. 24, 2005 (KR) .................. 10-2005-0054823

(51) Int. Cl.
*F02M 37/04* (2006.01)
(52) U.S. Cl. ...................... 123/502; 123/501
(58) Field of Classification Search ................ 123/446, 123/447, 501, 482, 488, 491, 492, 494, 511, 123/357, 472, 674, 305, 21, 145 R, 500, 304, 123/308, 301; 431/90; 137/101.19; 239/89; 417/459, 294, 25 P, 499, 215, 447; 701/101, 701/102, 103; 60/285; 429/13, 17, 34, 12–26, 429/28–46
See application file for complete search history.

(56) References Cited
U.S. PATENT DOCUMENTS
4,050,878 A * 9/1977 Priegel .................. 431/90
4,676,214 A * 6/1987 Kato et al. ............. 123/446
6,339,743 B1 * 1/2002 Young et al. ........... 701/115
6,587,766 B2 7/2003 Brückner (Continued)

FOREIGN PATENT DOCUMENTS
DE 40 36 905 A1 5/1991

(Continued)

OTHER PUBLICATIONS
Patent abstracts of Japan for publication No. 07-075214 dated Mar. 17, 1995 in the name of Helmut Lorenz, et al.

(Continued)

*Primary Examiner*—Stephen K Cronin
*Assistant Examiner*—Keith Coleman
(74) *Attorney, Agent, or Firm*—Christie, Parker & Hale, LLP

(57) ABSTRACT

A method of controlling a flow rate of fuel in a fuel supply unit of a fuel cell system is provided. The fuel cell system includes a fuel pump, a revolution per minute (RPM) measuring unit, a microcomputer, and a power converter. The method of controlling the flow rate controls the fuel supply unit so as to supply the fuel to a reformer reforming the fuel to generate hydrogen or a stack generating electric energy through a reaction of the fuel and oxygen. The method of controlling the flow rate includes measuring an actual RPM of the fuel pump; comparing the actual RPM to a reference RPM of the fuel pump; and adjusting a driving voltage of the fuel pump on the basis of the comparison result.

12 Claims, 4 Drawing Sheets

U.S. PATENT DOCUMENTS

2004/0247952 A1    12/2004    Milacic
2005/0147856 A1 *   7/2005    Albrodt et al. ................ 429/17

FOREIGN PATENT DOCUMENTS

| JP | 06-111843 | 4/1994 |
|----|-----------|--------|
| JP | 7-75214 | 3/1995 |
| JP | 07-222309 | 8/1995 |
| JP | 8-78031 | 3/1996 |
| JP | 09-028005 | 1/1997 |
| JP | 2004-165093 | 6/2004 |
| JP | 2004-207030 | 7/2004 |
| JP | 2006-244966 | 9/2006 |
| WO | WO 03/081689 A2 | 10/2003 |
| WO | WO 03/081689 A3 | 10/2003 |

OTHER PUBLICATIONS

Patent abstracts of Japan for publication No. 08-078031 dated Mar. 22, 1996 in the name of Hajime Saito.

European Search Report dated Nov. 3, 2006, for 06115965.3, in the name of Samsung SDI Co. Ltd.

Japanese Office action dated Feb. 2, 2010, for corresponding Japanese application 2006-174254, noting listed references in this IDS.

* cited by examiner

METHOD OF CORRECTING FLOW RATE IN FUEL SUPPLY UNIT OF FUEL CELL SYSTEM

CROSS-REFERENCE TO RELATED APPLICATION

This application claims priority to and the benefit of Korean Patent Application No. 10-2005-0054823, filed in the Korean Intellectual Property Office on Jun. 24, 2005, the entire content of which is incorporated herein by reference.

BACKGROUND OF THE INVENTION

1. Field of the Invention

The present invention relates to a method of controlling a fuel supply unit of a fuel cell system, and more particularly, to a method of correcting a flow rate in a fuel supply unit.

2. Description of the Related Art

Conventional fuel cell systems include a fuel pump for supplying fuel to a reformer or a stack. The fuel pump is driven by a motor so as to generate a pumping force, thereby supplying the fuel to the reformer or the stack.

When the fuel is supplied by the fuel pump, it is necessary to increase or decrease the quantity of fuel supplied as occasion demands. In one method, an output of the fuel pump is increased or decreased by changing the amount of power applied to the fuel pump, whereby the amount of the fuel is changed. In another method, a flow meter and a controller for controlling the flow meter are installed in the fuel pump, the flow meter measures the flow rate of the fuel, and the controller transmits a signal as the measurement result, thereby controlling the fuel pump in accordance with the processed signal.

The former method of controlling the flow rate is advantageous in that the fuel cell can be manufactured at low cost thanks to the simple construction thereof, but is disadvantageous in that a high-precision flow rate control is not anticipated. On the other hand, the latter method of controlling the flow rate is advantageous in that it is possible to perform a high-precision flow rate control, but is disadvantageous in that the flow meter and the controller for controlling the flow meter are additionally provided, thereby increasing production cost and the size of the entire system. Therefore, there is a desire for a fuel cell system capable of realizing a high-precise flow rate control at a low cost.

SUMMARY

A method of controlling a flow rate of fuel in a fuel supply unit of a fuel cell system, in which the fuel is supplied to a reformer reforming the fuel to generate hydrogen or a stack generating electric energy through a reaction of the fuel and oxygen, wherein the fuel cell system includes a fuel pump, a revolution per minute (RPM) measuring unit, a microcomputer, and a power converter, includes: measuring an actual RPM of the fuel pump; comparing the actual RPM to a reference RPM of the fuel pump; and adjusting a driving voltage of the fuel pump on the basis of the comparison result.

In one embodiment, the comparing includes determining the reference RPM by a flow rate control program stored on the microcomputer through calculating the following equations: $V_0=f_v(Q_0)$, and $rpm_0=f_{rpm}(Q_0)$, where $V_0$ represents a reference voltage, $Q_0$ represents a reference flow rate, and $rpm0$ represents the reference RPM of the fuel pump.

In another embodiment, the microcomputer has a flow rate control program therein for performing the following steps of: (a) measuring the actual RPM of the fuel pump when a reference voltage corresponding to a reference flow rate is applied to the fuel pump; (b) calculating an RPM difference obtained by subtracting the actual RPM of the fuel pump from the reference RPM corresponding to the reference flow rate; (c) calculating an actual flow rate of the fuel pump from the RPM difference and the reference voltage; (d) calculating a corrected flow rate required by the fuel pump by comparing the actual flow rate to the reference flow rate; and (e) calculating a corrected output on the basis of the RPM difference and the corrected flow rate, wherein the adjusting of the driving voltage further includes supplying a corrected voltage corresponding to the corrected output to the fuel pump.

The calculating of the actual flow rate may be on the basis of the following equation: $Q_C=f_Q(\Delta rpm, V_0)$, where $Q_C$ represents the actual flow rate, $V_0$ represents the reference voltage, and $\Delta rpm$ represents the RPM difference. The calculating of the corrected flow rate may be on the basis of the following equation: $Q_A=Q_0+(Q_0-Q_C)$, where $Q_A$ represents the corrected flow rate, $Q_0$ represents the reference flow rate, and $Q_C$ represents the actual flow rate. The calculating of the corrected output may be on the basis of the following equation: $V_A=f_v(\Delta rpm, Q_A)$, where $V_A$ represents the corrected output, $\Delta rpm$ represents the RPM difference, and $Q_A$ represents the corrected flow rate.

In another embodiment, the measuring of the actual RPM of the fuel pump includes: detecting an RPM of the fuel pump at a plurality of times to obtain a plurality of detection values; and averaging the plurality of detection values to obtain the actual RPM of the fuel pump.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the sprit or scope of the present invention. Accordingly, the drawings and description are to be regarded as illustrative in nature, rather than restrictive.

Figure 1:
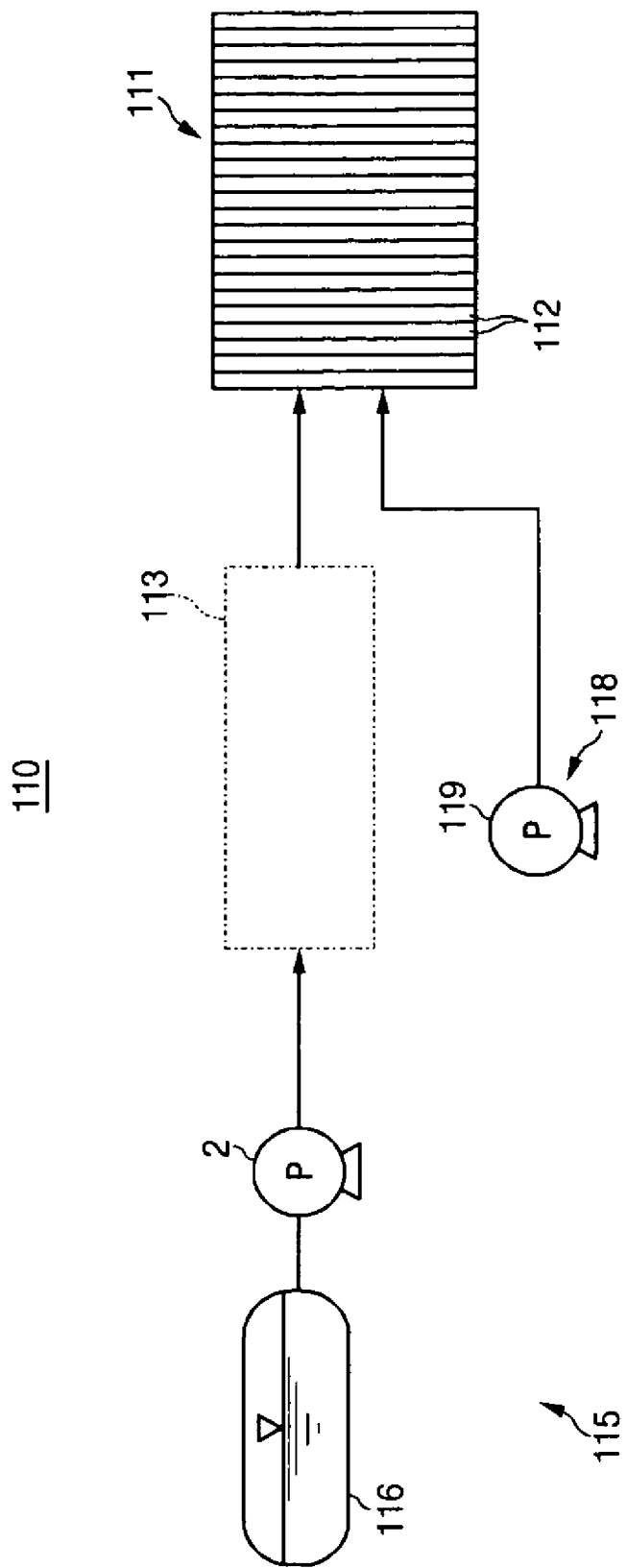
FIG. 1 is a schematic block diagram showing a fuel cell system according to an embodiment of the present invention.

FIG. 1 is a schematic block diagram illustrating a construction of a fuel cell system according to an embodiment of the present invention.

The fuel cell system 110 of FIG. 1 employs a polymer electrolyte membrane fuel cell (PEMFC) which generates hydrogen by reforming fuel and generates electric energy through an electro-chemical reaction of the hydrogen and an oxidant gas.

In the fuel cell system 110, the fuel used to generate the hydrogen includes a liquid or gas fuel containing hydrogen such as methanol, ethanol, or a natural gas. Hereinafter, liquid fuel will be referred to as "fuel" for convenience of description.

In the fuel cell system 110, the oxidant gas reacting with the hydrogen may be oxygen stored in a separate storage means or an air containing oxygen. Hereinafter, the latter will be discussed.

The fuel cell system 110 according to the embodiment shown in FIG. 1 basically includes a stack 111, which generates electric energy through a electro-chemical reaction of hydrogen and oxygen; a reformer 113, which generates the hydrogen from the aforementioned fuel by using thermal energy and supplies the hydrogen to the stack 111; a fuel supply unit 115, which supplies the fuel to the reformer 113; and an air supply unit 118, which supplies air to the stack 111.

The stack 111 is includes a fuel cell, which performs the electro-chemical reaction of the hydrogen supplied from the reformer 113 and the oxygen supplied from the air supply unit 118, thereby generating electric energy.

The stack 111 includes a minimum unit of electricity generators 112 for generating the electric energy. The electricity generators 112 can be constructed by disposing separators (also referred to as "bipolar plates") in close contact with both surfaces of a membrane electrode assembly (MEA).

In the present embodiment, a plurality of electricity generators 112 constituting the minimum unit. Therefore, the plurality of electricity generators 112 is sequentially disposed to form the stack 111 as a stacked structure of the electricity generators 112. Since the stack 111 can be constructed as a stack of a general polymer electrolyte membrane fuel cells, additional description of the stack will be omitted.

The reformer 113 generates the hydrogen from the fuel containing the hydrogen through a chemical catalytic reaction of fuel by using thermal energy, for example, a steam reforming reaction, a partial oxidation reaction, or an auto-thermal reaction.

A fuel supply unit 115 for supplying the fuel to the reformer 113 includes a fuel tank 116 which stores the fuel and a fuel pump 2 which is connected to the fuel tank 116 so as to discharge the fuel from the fuel tank 116.

The air supply unit 118 for supplying air to the stack 111 includes an air pump 119 which sucks air and supplies the air to the electricity generator 112 of the stack 111.

On the other hand, a fuel cell system according to another embodiment of the present invention can be constructed as a direct oxidation type fuel cell system, such as a direct methanol fuel cell (DMFC) system, in which a fuel is directly supplied to a stack and electric energy is generated through an electro-chemical reaction of the fuel and oxygen.

In addition, a fuel cell system according to another embodiment of the present invention can be constructed as an active type fuel cell system in which a fuel and oxygen are supplied from a fuel supply unit and an air supply unit, respectively, and electric energy is generated through an electro-chemical reaction of the fuel and oxygen. Unlike the PEMFC type fuel cell system, in the active type fuel cell system, it is possible to remove a reformer as indicated by an imaginary line in FIG. 1 and directly connect a fuel tank of the fuel supply unit and the stack by a pipeline.

Figure 2:
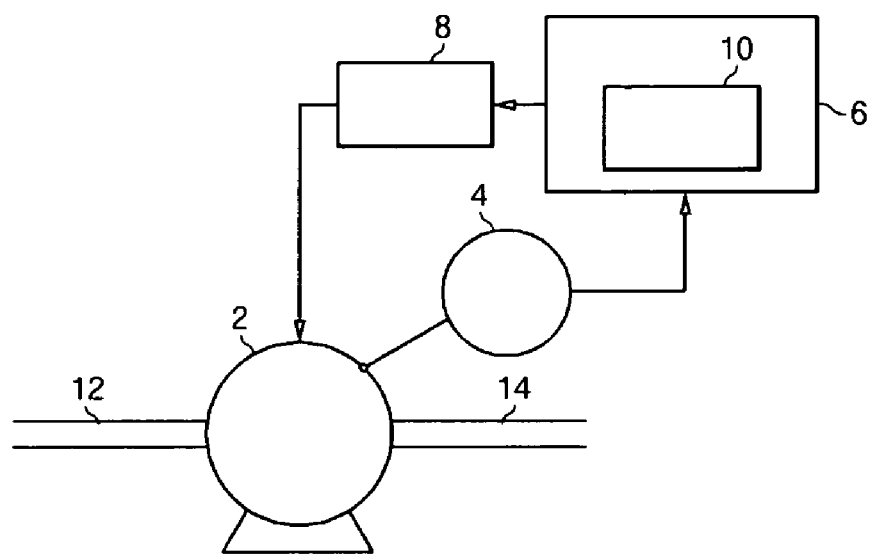
FIG. 2 is a schematic block diagram showing a flow rate control unit according to an embodiment of the present invention.
Figure 3:
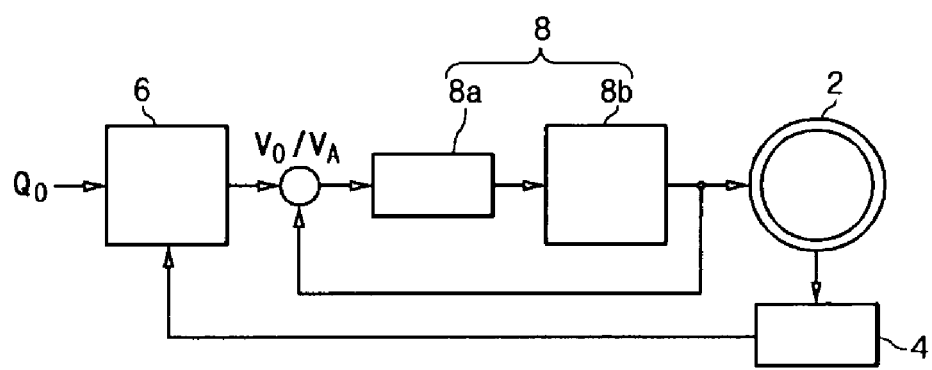
FIG. 3 is a schematic block diagram showing a control system of a flow rate control unit according to an embodiment of the present invention.

A method of correcting a flow rate according to an embodiment of the present invention, applicable to a fuel cell system 110 having the construction described above, can be applied to a flow rate supply controller which includes a fuel pump 2, a revolution per minute (RPM) measuring instrument 4, a microcomputer 6, and a power converter 8, as illustrated in FIGS. 2 and 3.

The flow rate control operation according to this embodiment is performed by detecting a back-pressure $P_B$ produced by the fuel which is discharged from an outlet 14 of the fuel pump 2 after the fuel is absorbed into an inlet 12 of the fuel pump 2.

A flow rate control program 10 stored in the microcomputer 6 stores therein Equations 1 and 2 for calculating a reference voltage $V_0$ represented by a function of a voltage value at a reference flow rate $Q_0$ and a reference RPM $rpm_0$ of the fuel pump 2 represented by a function of an RPM value at the reference flow rate $Q_0$.

$$V_0 = f_v(Q_0) \qquad \text{Equation 1}$$

$$rpm_0 = f_{rpm}(Q_0) \qquad \text{Equation 2}$$

Equations 1 and 2 are established on the basis of experimental data of the fuel supply amount obtained by changing values of the RPM of the fuel pump 2 and the power of the power converter 8 for driving the fuel pump 2.

Figure 4:
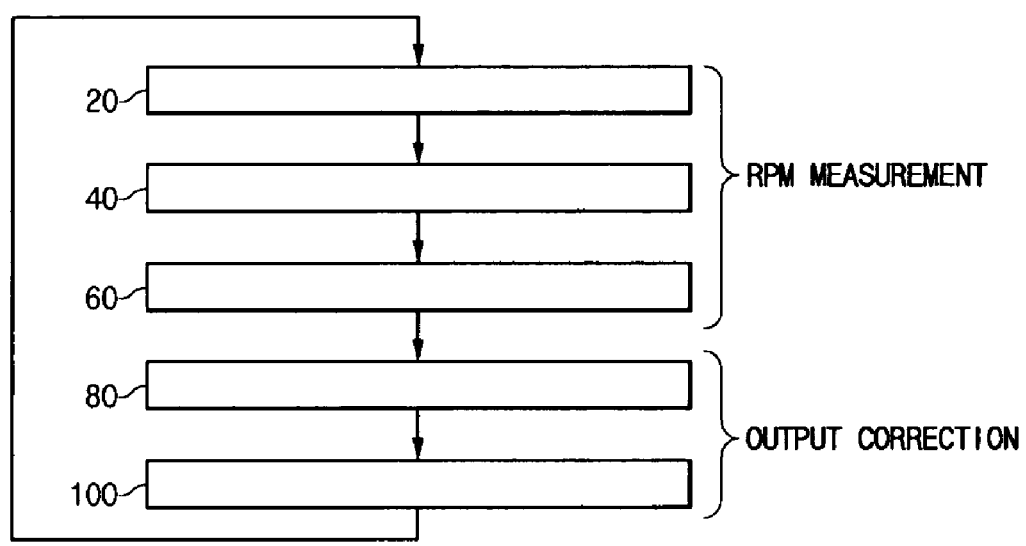
FIG. 4 is a flowchart showing a control process of a method of correcting a flow rate according to an embodiment of the present invention.
Figure 5:
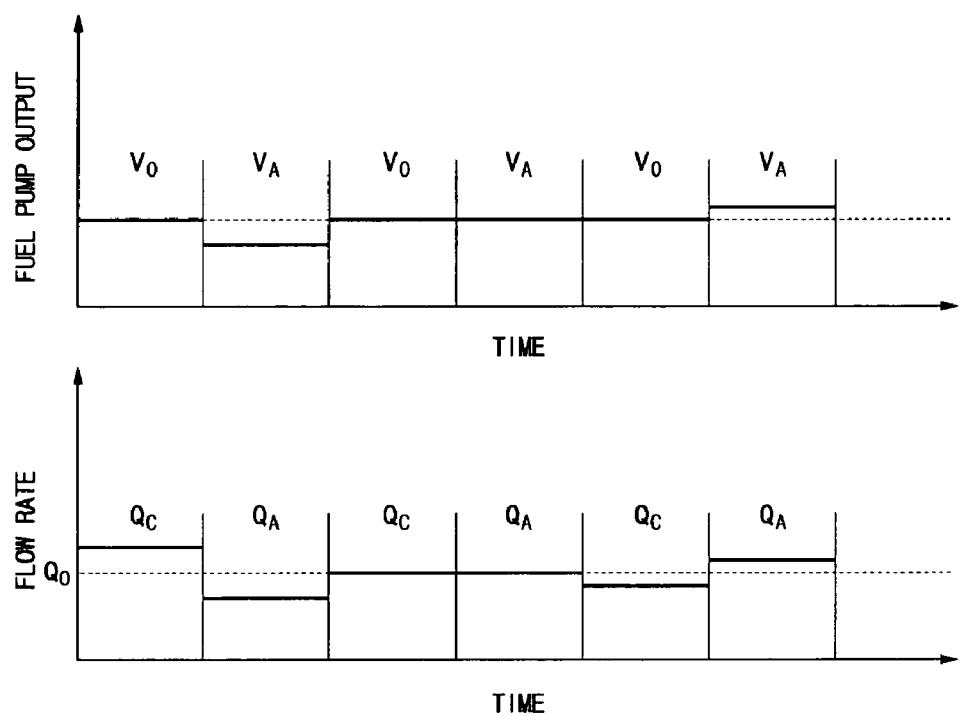
FIG. 5 is a timing diagram showing a relationship between an output of a fuel pump and a flow rate variation in the method of correcting a flow rate according to an embodiment of the present invention.

The flow rate control program 10 stored in the microcomputer 6 operates in accordance with the following steps as illustrated in FIGS. 4 and 5.

With reference to FIGS. 2-5, according to the instructions from the flow rate control program 10, in an RPM measuring step 20, the microcomputer 6 measures an actual RPM value rpm produced when a reference voltage $V_0$ corresponding to a reference flow rate $Q_0$ is applied to the fuel pump 2.

Since a back-pressure $P_B$ is generally unstable and experiences severe fluctuation, the revolution of the fuel pump 2 becomes unstable. Therefore, in order to promote an accurate measurement, an average value of the actual RPM values rpm obtained through more than three times of measurements is calculated and applied.

After measuring the actual RPM value rpm of the fuel pump 2 with application of the reference voltage $V_0$, the process proceeds to an output measuring step 40, where an output is measured by calculating the output based on the magnitude of the back-pressure.

More specifically, the back-pressure $P_B$ can be calculated by subtracting the measured RPM rpm of the fuel pump 2 from the reference RPM $rpm_0$ of the fuel pump 2 corresponding to the reference flow rate $Q_0$. In other words, the magnitude of back-pressure $P_B$ applied to the fuel pump 2 can be obtained from an RPM difference $\Delta rpm$ between the measured RPM value rpm and the reference RPM value $rpm_0$.

For example, when the RPM difference $\Delta rpm$ is equal to zero (0), it indicates that a desired amount of fuel is supplied to the fuel pump 2 and the reference back-pressure $P_B$ is applied to the fuel pump 2.

When the RPM difference $\Delta rpm$ is less than zero (0), it indicates that the amount of fuel supplied to the fuel pump 2 is greater than the reference flow rate $Q_0$ and the back-pressure applied to the fuel pump 2 is smaller than the reference back-pressure $P_B$.

When the RPM difference $\Delta rpm$ is greater than zero (0), it indicates that the amount of fuel supplied to the fuel pump 2 is smaller than the reference flow rate $Q_0$ and the back-pressure applied to the fuel pump 2 is greater than the reference back-pressure $P_B$.

Then, in a presently supplied flow rate calculating step 60, an actual flow rate $Q_C$ of the fuel pump 2 is calculated by substituting the RPM difference $\Delta$rpm calculated in the above-mentioned process and a predetermined reference voltage $V_0$ in Equation 3.

$$Q_C = f_Q(\Delta rpm, V_0) \quad\quad \text{Equation 3}$$

When the computing step of the actual flow rate $Q_c$ is completed, the process proceeds to a flow rate correcting step 80, where the actual flow rate $Q_C$ of the fuel pump 2 calculated in step 60 is compared to a predetermined reference flow rate $Q_0$ so as to obtain a corrected flow rate $Q_A$ indicative of whether the presently supplied flow rate $Q_C$ is deficient or overabundant.

The corrected flow rate $Q_A$ is calculated by Equation 4.

$$Q_A = Q_0 + (Q_0 - Q_C) \quad\quad \text{Equation 4}$$

When the computing step of the corrected flow rate $Q_A$ is completed, the process proceeds to an output correcting step 100, where a corrected output voltage $V_A$ of the fuel pump 2 is calculated on the basis of the RPM difference $\Delta$rpm and the corrected flow rate $Q_A$. The corrected output voltage $V_A$ of the fuel pump 2 is calculated by Equation 5.

$$V_A = f_v(\Delta rpm, Q_A) \quad\quad \text{Equation 5}$$

Equation 5 can be obtained by rearranging Equation 4 or by using data applied in Equation 3.

It is desirable to provide the same time periods to the RPM measuring step 20 and the output correcting step 100 but it is not always necessary to provide the same time periods to the steps 20 and 40. When different time periods are provided to the steps 20 and 40, it is necessary to multiply the difference quantity $(Q_0-Q_C)$ in Equation 4 by a correction value [(RPM measurement time)/(output correction time)].

The process cycle of the flow rate control program 10 is repeated at a predetermined time interval.

The electrical operation of the fuel supply controller according to an embodiment of the present invention may be controlled under the control of a control system depicted in FIG. 3 on the basis of the actual values of the above-mentioned data.

The microcomputer 6 controls the power converter 8 so that a voltage value output through an output terminal of the power converter 8 is changed according to the output signal from the microcomputer 6 input to the power converter 8.

The microcomputer 6 controls the power converter 8 so that a voltage value output through an output terminal of the power converter 8 is changed according to the output signal from the microcomputer 6 input to the power converter 8.

The power converter 8 basically includes a current controller 8a and a converter 8b, and the output of the power converter 8 is input for feedback in order to enable a precise control thereof.

The fuel pump 2 is driven by the output voltage from the power converter 8. The RPM of the fuel pump 2 is measured by the RPM measuring instrument 4 and input to the microcomputer 6.

In the method of correcting a flow rate according to this embodiment of the present invention, since the output of the fuel pump 2 is correlated to the flow rate of the fuel, it is possible to supply the fuel at a uniform flow rate as illustrated in FIG. 5.

More specifically, when it is assumed that steps 20, 40, and 60 in FIG. 4 correspond to the RPM measuring operation and steps 80 and 100 in FIG. 4 correspond to the output correcting operation, the actual fuel discharge flow rate increases or decreases by repeatedly performing the RPM measuring operation and the output correcting operation while driving the fuel pump 2 and by changing the voltage applied to the fuel pump 2 in accordance with values calculated by the above-mentioned equations.

As described above, the voltage applied to the fuel pump is changed by using the control program stored in a microcomputer, without requiring a flow meter and a controller for controlling the flow meter, thereby increasing or decreasing the flow rate of the fuel discharged from an outlet of the fuel pump. Accordingly, it is possible to provide a fuel supply unit with high precision, a simple construction, and low production cost.

Although exemplary embodiments of the present invention have been described, the present invention is not limited to the embodiments and examples, but may be modified in various forms without departing from the scope of the appended claims, the detailed description, and the accompanying drawings of the present invention. Therefore, such modifications belong to the scope of the present invention as defined by the appended claims and their equivalents.

What is claimed is:

1. A method of controlling a flow rate of fuel in a fuel supply unit of a fuel cell system, the method comprising:
   supplying fuel using a fuel pump to a reformer reforming the fuel to generate hydrogen for a stack of the fuel cell system generating electric energy through a reaction of the fuel and oxygen, wherein the fuel cell system comprises the fuel pump, a revolution per minute (RPM) measuring unit, a microcomputer, and a power converter;
   measuring an actual RPM of the fuel pump by detecting an RPM of the fuel pump at a plurality of times to obtain a plurality of detection values and averaging the plurality of detection values to obtain the actual RPM of the fuel pump;
   directly comparing the actual RPM to a reference RPM of the fuel pump; and
   adjusting a driving voltage of the fuel pump on the basis of a result obtained by directly comparing the actual RPM to the reference RPM of the fuel pump.

2. The method of claim 1, wherein the comparing comprises:
   determining the reference RPM by a flow rate control program stored on the microcomputer through calculating the following equations:

$$V_0 = f_v(Q_0)$$

$$rpm_0 = f_{rpm}(Q_0),$$

where $V_0$ represents a reference voltage, $Q_0$ represents a reference flow rate, and $rpm_0$ represents the reference RPM of the fuel pump.

3. The method of claim 1, wherein the microcomputer has a flow rate control program therein for performing the following steps of:
   (a) measuring the actual RPM of the fuel pump when a reference voltage corresponding to a reference flow rate is applied to the fuel pump;
   (b) calculating an RPM difference obtained by subtracting the actual RPM of the fuel pump from the reference RPM corresponding to the reference flow rate;
   (c) calculating an actual flow rate of the fuel pump from the RPM difference and the reference voltage;
   (d) calculating a corrected flow rate required by the fuel pump by comparing the actual flow rate to the reference flow rate; and (e) calculating a corrected output on the basis of the RPM difference and the corrected flow rate, wherein the adjusting of the driving voltage further comprises supplying a corrected voltage corresponding to the corrected output to the fuel pump.

4. The method of claim 3, wherein the calculating of the actual flow rate is on the basis of the following equation:

$$Q_C = f_Q(\Delta rpm, V_0)$$

where $Q_C$ represents the actual flow rate, $V_0$ represents the reference voltage, and $\Delta rpm$ represents the RPM difference.

5. The method of claim 3, wherein the calculating of the corrected flow rate is on the basis of the following equation:

$$QA = Q0 + (Q0 - QC)$$

where QA represents the corrected flow rate, Q0 represents the reference flow rate, and QC represents the actual flow rate.

6. The method of claim 3, wherein the calculating of the corrected output is on the basis of the following equation:

$$VA = fv(\Delta rpm, QA),$$

where VA represents the corrected output, $\Delta rpm$ represents the RPM difference, and QA represents the corrected flow rate.

7. A method of controlling a flow rate of fuel in a fuel supply unit of a fuel cell system, the method comprising:

supplying fuel using a fuel pump to a reformer reforming the fuel to generate hydrogen for a stack of the fuel cell system generating electric energy through a reaction of the fuel and oxygen, wherein the fuel cell system comprises the fuel pump, a revolution per minute (RPM) measuring unit, a microcomputer, and a power converter;

measuring an actual RPM of the fuel pump;

directly comparing the actual RPM to a reference RPM of the fuel pump by determining the reference RPM by a flow rate control program stored on the microcomputer through calculating the following equations:

$$V_0 = f_v(Q_0)$$

$$rpm_o = f_{rpm}(Q_0),$$

where $V_0$ represents a reference voltage, $Q_0$ represents a reference flow rate, and $rpm_o$ represents the reference RPM of the fuel pump; and adjusting a driving voltage of the fuel pump on the basis of a result obtained by directly comparing the actual RPM to the reference RPM of the fuel pump.

8. The method of claim 7, wherein the microcomputer has a flow rate control program therein for performing the following steps of:

(a) measuring the actual RPM of the fuel pump when a reference voltage corresponding to a reference flow rate is applied to the fuel pump;

(b) calculating an RPM difference obtained by subtracting the actual RPM of the fuel pump from the reference RPM corresponding to the reference flow rate;

(c) calculating an actual flow rate of the fuel pump from the RPM difference and the reference voltage;

(d) calculating a corrected flow rate required by the fuel pump by comparing the actual flow rate to the reference flow rate; and (e) calculating a corrected output on the basis of the RPM difference and the corrected flow rate, wherein the adjusting of the driving voltage further comprises supplying a corrected voltage corresponding to the corrected output to the fuel pump.

9. The method of claim 8, wherein the calculating of the actual flow rate is on the basis of the following equation:

$$Q_C = f_Q(\Delta rpm, V_0)$$

where $Q_C$ represents the actual flow rate, $V_0$ represents the reference voltage, and $\Delta rpm$ represents the RPM difference.

10. The method of claim 8, wherein the calculating of the corrected flow rate is on the basis of the following equation:

$$QA = Q0 + (Q0 - QC)$$

where QA represents the corrected flow rate, Q0 represents the reference flow rate, and QC represents the actual flow rate.

11. The method of claim 8, wherein the calculating of the corrected output is on the basis of the following equation:

$$VA = fv(\Delta rpm, QA),$$

where VA represents the corrected output, $\Delta rpm$ represents the RPM difference, and QA represents the corrected flow rate.

12. The method of claim 7, wherein the measuring of the actual RPM of the fuel pump comprises:

detecting an RPM of the fuel pump at a plurality of times to obtain a plurality of detection values; and averaging the plurality of detection values to obtain the actual RPM of the fuel pump.

\* \* \* \* \*